(12) United States Patent
Hipp-Kalthoff et al.

(10) Patent No.: US 10,252,598 B2
(45) Date of Patent: Apr. 9, 2019

(54) AIR-CONDITIONING SYSTEM FOR A VEHICLE

(71) Applicant: Mahle International GmbH, Stuttgart (DE)

(72) Inventors: Christoph Hipp-Kalthoff, Stuttgart (DE); Hans-Henning Knorr, Remshalden (DE); Klaus Voigt, Bietigheim-Bissingen (DE)

(73) Assignee: Mahle International GmbH (DE)

( * ) Notice: Subject to any disclaimer, the term of this patent is extended or adjusted under 35 U.S.C. 154(b) by 0 days.

(21) Appl. No.: 15/738,573

(22) PCT Filed: Jun. 23, 2016

(86) PCT No.: PCT/EP2016/064583
§ 371 (c)(1),
(2) Date: Dec. 20, 2017

(87) PCT Pub. No.: WO2016/207302
PCT Pub. Date: Dec. 29, 2016

(65) Prior Publication Data
US 2018/0178622 A1   Jun. 28, 2018

(30) Foreign Application Priority Data
Jun. 23, 2015 (DE) .................. 10 2015 211 608

(51) Int. Cl.
*B60H 1/32* (2006.01)
*B60H 1/00* (2006.01)
*B61D 27/00* (2006.01)

(52) U.S. Cl.
CPC ..... *B60H 1/00535* (2013.01); *B60H 1/00371* (2013.01); *B60H 1/00528* (2013.01); *B60H 2001/00235* (2013.01); *B61D 27/0072* (2013.01)

(58) Field of Classification Search
CPC ............ B60H 1/00535; B60H 1/00371; B60H 1/00528; B60H 1/00521; B60H 1/00542; B60H 2001/00235; B61D 27/0072
(Continued)

(56) References Cited

U.S. PATENT DOCUMENTS 5,184,474 A * 2/1993 Ferdows ............ B60H 1/00371
62/244
2002/0073723 A1 6/2002 Hoos
(Continued)

FOREIGN PATENT DOCUMENTS

DE    3346243 A1   7/1985
DE    4222837 A1   1/1994
(Continued)

OTHER PUBLICATIONS

English abstract for DE-102009056968.
(Continued)

*Primary Examiner* — Joseph Trpisovsky
(74) *Attorney, Agent, or Firm* — Fishman Stewart PLLC

(57) ABSTRACT

An air-conditioning system for a vehicle may include at least one of a condenser module including a condenser housing and a condenser, the condenser arranged in the condenser housing, and an air-conditioning module including an air-conditioning housing and an evaporator, the evaporator arranged in the air-conditioning housing. The air-conditioning system may also include a plastic support frame including a plurality of parts, the support frame configured to support at least one of the condenser module and the air-conditioning module, and to hold at least one of the condenser module and the air-conditioning module on a vehicle roof. The air-conditioning system may also include at least one detent housing connection. The air-conditioning system may also include at least one of at least one detent
(Continued)

support connection and at least one plug-type support connection including a securing element.

20 Claims, 8 Drawing Sheets

(58) Field of Classification Search
USPC .......................................................... 62/244
See application file for complete search history.

(56) References Cited

U.S. PATENT DOCUMENTS

| | | | |
|---|---|---|---|
| 2006/0059932 A1* | 3/2006 | Czechowicz | B60H 1/00535 62/239 |
| 2010/0006257 A1* | 1/2010 | Schutz | B60H 1/00371 165/61 |
| 2010/0024458 A1 | 2/2010 | Schmitt et al. | |
| 2010/0218530 A1* | 9/2010 | Melbostad | B60H 1/00371 62/244 |

FOREIGN PATENT DOCUMENTS

| | | |
|---|---|---|
| DE | 10062686 A1 | 7/2002 |
| DE | 102006047367 B4 | 1/2009 |
| DE | 102007062943 A1 | 6/2009 |
| DE | 102009056968 B3 | 3/2011 |
| DE | 102012018272 A1 | 3/2014 |
| DE | 102012216039 A1 | 5/2014 |
| EP | 2042011 A1 | 4/2009 |
| FR | 2783226 A1 | 3/2000 |

OTHER PUBLICATIONS

English abstract for DE-102012018272.
English abstract for DE-102012216039.
English abstract for DE-3346243.
English abstract for DE-4222837.
English abstract for FR-2783226.
English abstract for DE-102007062943.

* cited by examiner

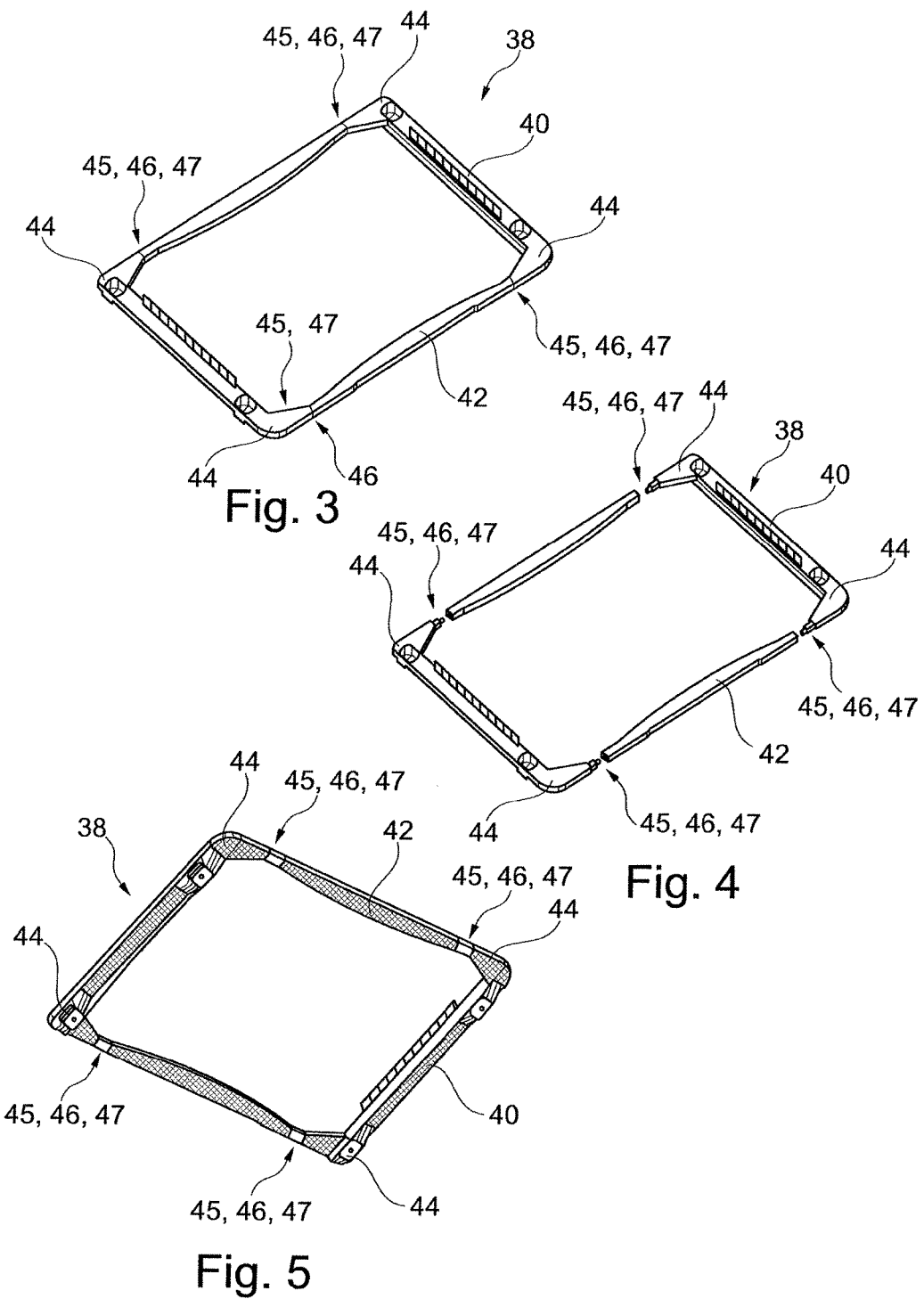

AIR-CONDITIONING SYSTEM FOR A VEHICLE

CROSS-REFERENCE TO RELATED APPLICATIONS

This application claims priority to German Patent Application No. DE 10 2015 211 608.5, filed on Jun. 23, 2015, and International Application No. PCT/EP2016/064583, filed on Jun. 23, 2016, the contents of each of which are hereby incorporated by reference in their entirety.

TECHNICAL FIELD

The invention relates to an air-conditioning system for a vehicle, for example a bus, heavy goods vehicle or rail vehicle, in particular a rooftop air-conditioning system for mounting on a vehicle roof, having a condenser module and/or an air-conditioning module. The invention further relates to a vehicle having such an air-conditioning system.

BACKGROUND

Such air-conditioning systems are used for example to cool an interior of the vehicles and to thus provide a pleasant climate for the passengers of the vehicle. Roof air-conditioning systems are arranged on the vehicle roof of the vehicle. On the one hand, the interior of the vehicle can thus be air-conditioned more evenly, on the other hand, no space is required for the air-conditioning system in the constricted engine compartment of the vehicle. Such roof air-conditioning systems are typically made with support frames of metal. Such support frames and thus also the air-conditioning systems are relatively heavy. A large weight of the air-conditioning system is unfavorable when mounting on the roof, because this influences the behavior of the vehicle in a disadvantageous manner.

A generic roof air-conditioning system is for example known from DE 10 2009 056 968 B3.

A roof air-conditioning having a composite housing is known from DE 10 2006 047 367 B4. The housing is thereby made of aluminum or of injection molded plastic or foamed plastic.

DE 10 2012 018 272 A1 discloses a roof air-conditioning system having a position-stabilized cover, which can be opened up via an axis of rotation, so that the air-conditioning system can be maintained. Due to the axis of rotation, the cover can be positioned easily again, so that the opening and closing of the air-conditioning system is simple. In addition, a pin or pin receiver serve to position the cover and can thereby consist of expanded plastic.

DE 10 2012 216 039 A1 discloses a housing for an air-conditioning system. A housing tray of the housing is made of plastic material.

FR 2783 226 A1 discloses an air-conditioning arrangement, in the case of which a multi-part support frame is provided. The individual parts of the support frame are formed by means of square tubes, which are connected to one another via corner elements, which engage with the square tubes.

DE 100 62 686 A1 discloses an air-conditioning system for mounting to a roof opening of the roof of a vehicle, which is reinforced by means of a frame, wherein the partial frame, which corresponds to the roof opening, forms a base device of the air-conditioning system, to which components of the air-conditioning system are attached.

DE 2007 062 943 A1 discloses a vehicle air-conditioning system comprising a throttle hatch arranged on the vehicle roof and/or on an air-conditioning housing. The throttle hatch is connected to the vehicle roof and/or the air-conditioning housing via hinges.

Even though these air-conditioning systems have in common that individual components are made of plastic, the mounting of the individual components is unfavorable.

SUMMARY

The invention at hand is based on the object of providing an improved or at least a different embodiment of an air-conditioning system, which is characterized in particular by a reduced weight and/or by a simple mounting and/or production of the individual components.

According to the invention, this object is solved by means of the subject matters of the independent claim(s). Advantageous further developments are the subject matter of the dependent claims.

The invention is based on the general idea of making some components of the air-conditioning of plastic, in particular the condenser housing and/or the support frame. Connections, such as for example detent, rivet or screw connections, are made on the support frame in order to fasten the individual components, which are made of plastic, to one another or to the vehicle roof. It is advantageous that at least one detent connection is provided on the support frame for fastening the support frame. In the alternative or in addition, at least one plug-type connection with securing element can be provided on the support frame for fastening the support frame. The air-conditioning system can thus be mounted easily. This is in particular advantageous, because it is a rooftop air-conditioning system, in the case of which the future repair and new mounting to the vehicle roof is difficult.

According to the invention, the support frame is made of plastic, in particular by means of injection molding, for the support frame to comprise a plurality of parts and for the parts of the support frame to be connected to one another by means of the at least one detent connection and/or by means of the at least one plug-type connection with securing element. Due to the fact that the support frame is made of plastic, a significant amount of metal can be saved, thus reducing the weight of the air-conditioning system. By dividing the support frame into a plurality of parts, it can be attained that the injection molds required for the production of the individual parts are in each case significantly smaller than an injection mold, by means of which the support frame could be embodied in one piece. The reason for this is in particular that the support frame encloses a surface, which is not filled completely and which would also need to encompass the injection mold. Due to the fact that the individual parts of the support frame are connected to one another by means of the at least one detent connection, the individual parts of the support frame can be easily connected to one another, so that the mounting effort for the air-conditioning system is not increased by dividing the support frame. In fact, this can even be made easier, because, due to its dimensions, it is more difficult to position the support frame in one piece than to position the individual parts of the support frame.

In the description and the enclosed claims, "in several parts" means at least in two parts.

A further favorable option provides that the support frame has a substantially rectangular basic shape with two cross members and two longitudinal members, whereby the cross members and the longitudinal members are in each case connected to one another via detent connections and/or by means of plug-type connections with securing element. The support frame is thus divided into four parts, which can be connected to one another via the detent connections. The injection molds required for the individual parts thus enclose a small surface, because the cross members and the longitudinal members are embodied in a substantially elongated manner. Costs for the production of the injection mold and for the storage of the injection molds can thus be reduced in this way.

A particularly favorable option provides that corners of the support frame are embodied on the longitudinal members. This means in particular that the detent connections and/or by means of the plug-type connections with securing elements on the cross members are oriented in a longitudinal direction of the cross member and that the detent connections on the longitudinal members are embodied at right angles to a longitudinal direction of the longitudinal members or vice versa. The rectangular basic shape of the support frame can be attained in a simple manner in this way.

According to the invention, an advantageous alternative provides for the support frame to support the condenser module and/or the air-conditioning module, at least one detent connection is provided on the support frame for fastening the condenser housing and/or the air-conditioning housing. The mounting of a more complex air-conditioning system with condenser module can thus be facilitated.

An advantageous solution provides that at least one plug-type connection with securing element is provided on the support frame for fastening the condenser housing and/or the air-conditioning housing. In addition to the detent connection, such a plug-type connection can also be provided. The stability of the connection can thus be increased.

A further particularly favorable option provides that the longitudinal members are longer than the cross members. In the longitudinal direction, the air-conditioning system can thus be divided easily into two sections, which in each case perform different tasks. The air-conditioning module and the condenser module for example can thus be arranged behind one another in the longitudinal direction, without thereby creating an asymmetry in the cross direction of the vehicle.

An advantageous solution provides for the support frame to have a substantially rectangular basic shape with two cross members and two longitudinal members, whereby the support frame is divided at the longitudinal members or the cross members in such a way that the condenser module is arranged on a first part of the support frame and the air-conditioning module is arranged on a second part of the support frame. The condenser module and the air-conditioning module can thus be mounted separately from one another and can be connected to one another in the future by connecting the two parts of the support frame in response to the mounting of the air-conditioning system, in order to form the finished air-conditioning system. The pre-mounting of the air-conditioning system is thus simplified considerably.

A further advantageous solution provides for the first part of the support frame and the second part of the support frame to be connected to one another by means of the at least one detent connection. The mounting of the air-conditioning system, in particular the connecting of the two parts of the air-conditioning system, can thus be facilitated considerably, because the establishing of a detent connection is very simple.

A particularly advantageous solution provides for the first part of the support frame and the second part of the support frame to be plugged into one another and to be connected to the vehicle roof via a common screw connection at one connecting point. The two parts of the support frame can also be connected to one another without any complications in this way. The screw connection, which is required in any event, thus serves as cross connection between the two support frames.

A favorable alternative provides for the condenser housing to be connected to the support frame by means of the at least one detent connection. The mounting of the air-conditioning system can thus be facilitated even further.

A further favorable alternative provides for the detent connection to be embodied in a releasable manner. In the case of a future maintenance of the air-conditioning system, the condenser housing can thus be easily separated from the frame, so that the condenser can be accessed.

A particularly favorable alternative provides for the detent connection on the condenser housing to have detent elements, which in each case comprise a spring element and a detent lug, which is held on the spring element. The detent lug is thus pretensioned by means of the spring element, so that the detent lug can engage with a counter detent element. In particular, the detent lug snaps into a positive connection, driven by the spring element.

A further particularly advantageous alternative provides for a plurality of counter detent elements, which are in each case formed by a depression with undercut and with which the detent elements of the condenser housing engage, to be arranged on the support frame, in particular on a holder for the condenser module. Such counter detent elements can be formed particularly easily by means of a recess in a flat material. Moreover, there is an outstanding cooperation between such counter detent elements and the described detent elements, so that a good detent connection can be established between the condenser housing and the support frame.

An advantageous option provides that the detent elements have a lever, which protrudes from the counter detent elements, when the detent connection is established, and by means of which the detent lug can be moved in such a way that the detent connection can be released. In particular, the spring element of the detent elements can be tensioned via the lever, so that the detent lug can be pulled out of the undercut of the counter detent elements and the detent connection can thus be released.

A further advantageous option provides that the condenser housing is made of plastic, in particular by injection molding. The condenser housing thus has only a small weight, so that the weight of the air-conditioning system as a whole can be reduced.

A particularly advantageous option provides that the rooftop air-conditioning system has at least one reinforcing element, which reinforces a component made of plastic. Such components made of plastic can in particular be the support frame and/or the condenser housing. By using a reinforcing element, the stiffness of the respective component can be increased. The required amount of material as a whole can thus be reduced, so that a cost savings is thus also attained. The reinforcing element can in particular be provided at such points, at which an increased stiffness or strength is necessary. More expensive or heavier material can thus be used specifically only at those points, at which it is actually required. The weight of the respective component as a whole can thus be reduced.

A favorable solution provides for the reinforcing element to be made of metal. Compared to plastics, metals have a higher strength and stiffness. A reinforcing element made of metal is thus well suited to reinforce a component made of plastic. At the same time, only a small weight increase is thus effected simultaneously, because the reinforcing element is used specifically only at those points, at which the increased strength of the reinforcing element is necessary.

A further favorable solution provides for the reinforcing element to be a sheet metal part. Sheet metal parts can be produced very easily by means of punching tools. The reinforcing elements can thus be produced in a cost-efficient manner.

The above-mentioned task is further solved by means of a vehicle with an air-conditioning system according to the above description, whereby the air-conditioning system is arranged on a roof of the vehicle and air-conditions the interior of the vehicle.

Further important features and advantages of the invention follow from the subclaims, from the drawings, and from the corresponding figure description by means of the drawings.

It goes without saying that the above-mentioned features and the features, which will be described below, cannot only be used in the respective specified combination, but also in other combinations or alone, without leaving the scope of the invention at hand.

Preferred exemplary embodiments of the invention are illustrated in the drawings and will be described in more detail in the description below, whereby identical reference numerals refer to identical or similar or functionally identical components.

BRIEF DESCRIPTION OF THE DRAWINGS

In each case schematically,

FIG. 3 shows a top view onto a support frame, FIG. 4 shows an exploded drawing of the support frame from FIG. 3, FIG. 5 shows a top view from the bottom onto the support frame from FIG. 3.

DETAILED DESCRIPTION

Figure 1:
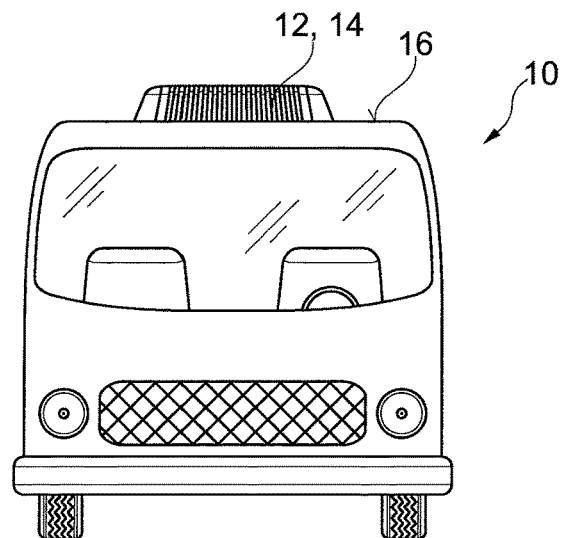
FIG. 1 shows a vehicle having a rooftop air-conditioning system.

A vehicle 10 illustrated in FIG. 1, for example a motor vehicle, such as a bus or a rail vehicle, has an air-conditioning system 12, which is embodied as rooftop air-conditioning system 14. The air-conditioning system 12 is arranged on a vehicle roof 16. The air-conditioning system 12 has a condenser module 18, which comprises a condenser 20 having a heat exchanger, a fan 22 and a condenser housing 24. A coolant condenses inside the condenser 20, whereby the air-conditioning system 12 can emit heat into the environment. The air-conditioning system 12 further has an air-conditioning module 26, which has an evaporator 28 having a heat exchanger, at least one fan 30, a heater 32 having a heat exchanger, and an air-conditioning housing 34. Coolant can evaporate in the evaporator 28 and can thus absorb heat, so that air, with which an interior of the vehicle 10 can be cooled, can be cooled by means of the heat exchanger.

The air-conditioning system 12 further has a cover 36, by means of which the air-conditioning system 12 is covered. The air-conditioning system 12 furthermore has a support frame 38, which supports the condenser module 18, the air-conditioning module 26, and the cover 36. The elements of the air-conditioning system 12 are connected to the vehicle roof 16 with the help of the support frame 38.

The support frame 38 has a substantially rectangular basic shape. The support frame 38 has in particular two longitudinal members 40 and two cross members 42. The longitudinal members 40 and cross members 42 are connected to one another at corners 44 of the support frame 38.

The support frame 38 is made of plastic. The support frame 38 is in particular made by means of a plastic injection molding method. This provides for a large ease of variation in the shape of the support frame 38. Plug-type connections 45 with securing element 47, such as for example detent connections 46, can thus for example be attached to the support frame 38 in a simple manner. The longitudinal members 40 and the cross members 42 are embodied separately from one another. This means that they are made in separate injection molds. The injection molds for the longitudinal members 40 and cross members 42 can thus be made significantly more cost-efficiently than an injection mold, into which the support frame 38 can be injected in one piece.

The longitudinal members 40 and the cross members 42 are connected to one another by means of the detent connections 46. The support frame 38 preferably has at least four detent connections 46. The detent connections 46 are thereby preferably arranged in the vicinity of the corners 44 of the support frame 38. The longitudinal members 40 or the cross members 42 only span a small surface in this way, whereby the injection molds for the longitudinal members 40 and the cross members 42 can be embodied so as to be smaller.

Figure 6:
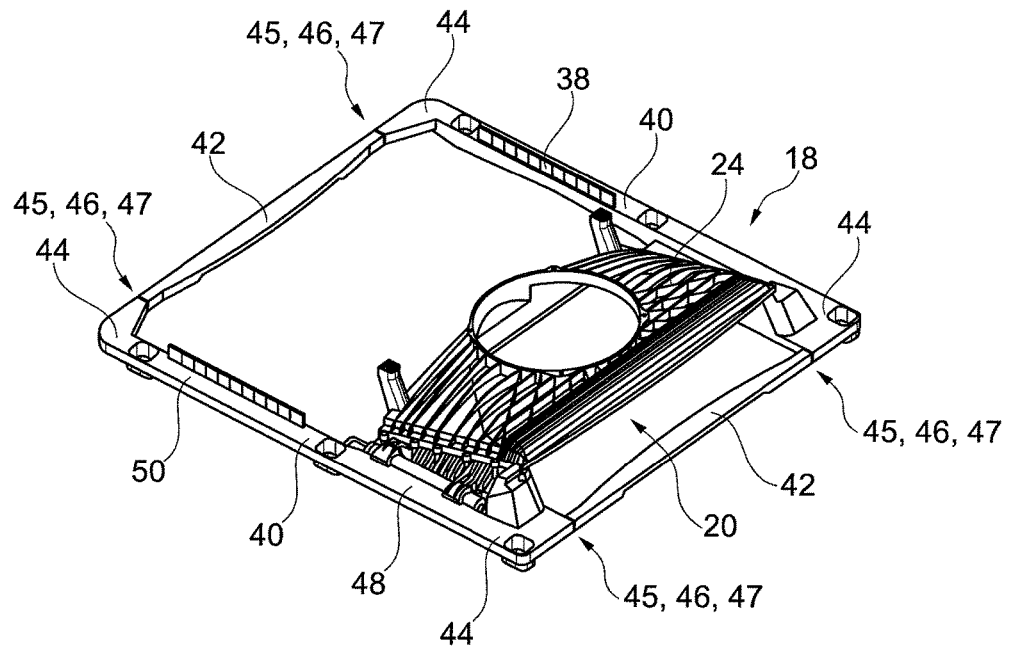
FIG. 6 shows a perspective view of a support frame according to a second embodiment having a condenser housing, which is held on the support frame.
Figure 7:
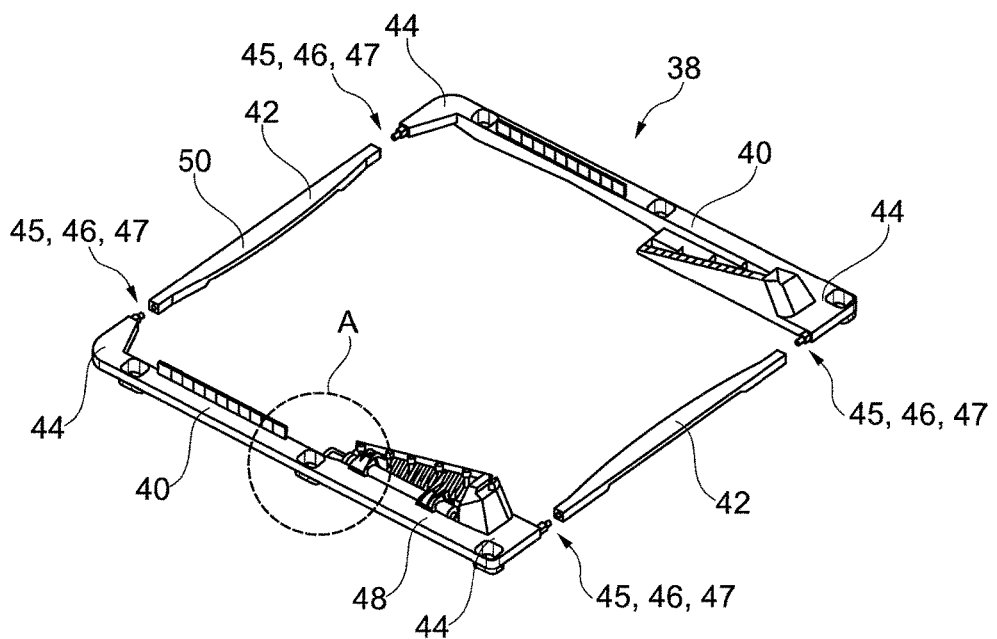
FIG. 7 shows a perspective exploded illustration of the support frame from FIG. 6.
Figure 8:
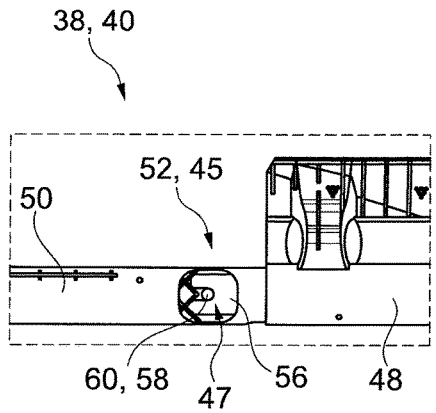
FIG. 8 shows an enlarged illustration of the area A from FIG. 7.
Figure 9:
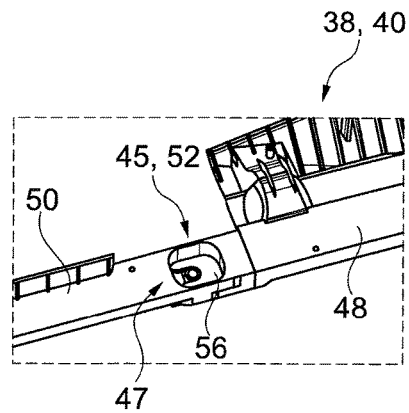
FIG. 9 shows a further enlarged illustration of the area A from FIG. 7.
Figure 10:
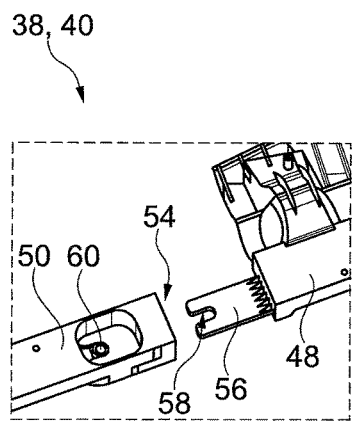
FIG. 10 shows an enlarged illustration of an area, which corresponds to the area A from FIG. 7, of a support frame according to an alternative of the second embodiment.
Figure 11:
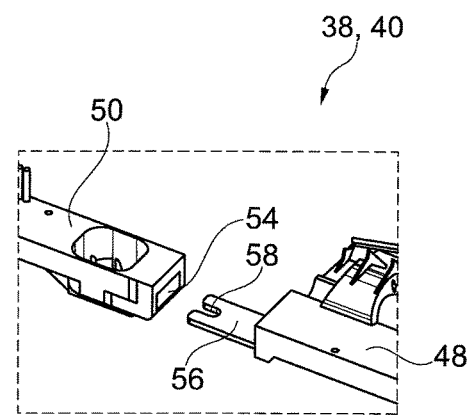
FIG. 11 shows a perspective illustration according to FIG. 10 from a different perspective.

The corners can thus be arranged on the cross members 42 or on the longitudinal members 40, as is illustrated for example in FIGS. 6 and 7.

Figure 2:
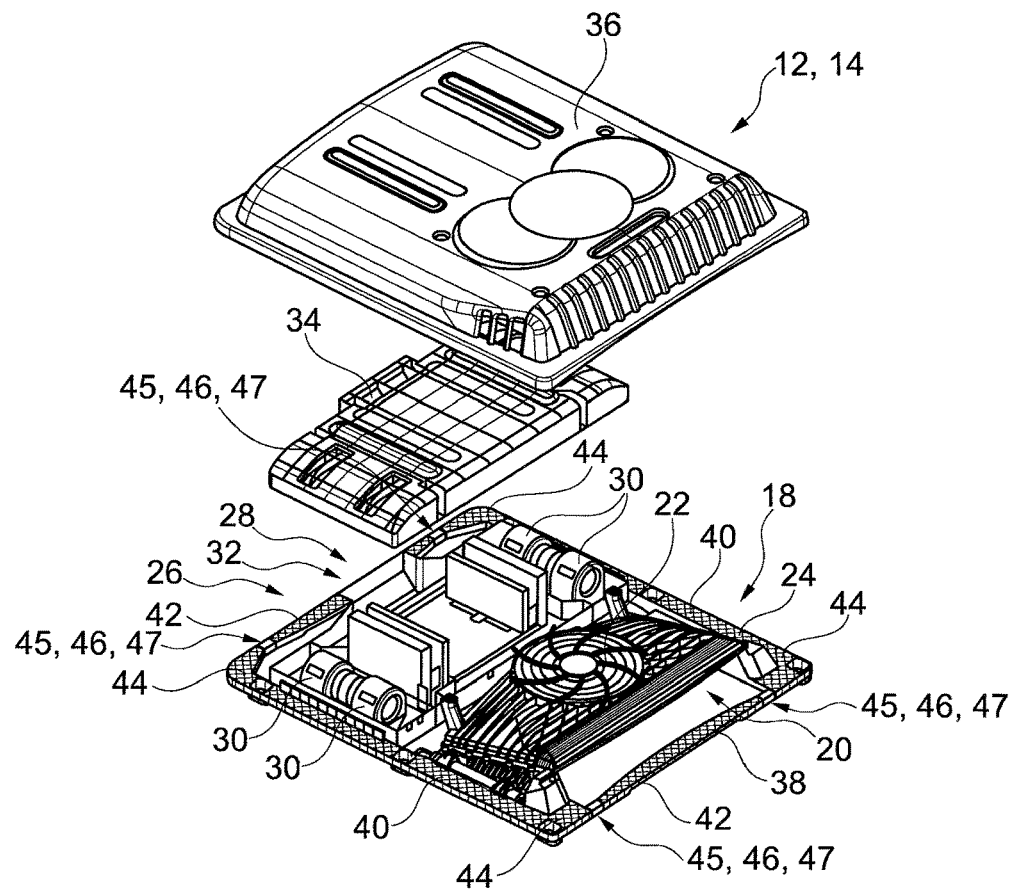
FIG. 2 shows a partially exploded illustration of a rooftop air-conditioning system.

A second alternative of the first embodiment of the air-conditioning system 12 illustrated in FIGS. 3 to 5 differs from the first alternative of the first embodiment of the air-conditioning system 12 illustrated in FIGS. 1 and 2 in that no condenser module 18 is held on the support frame 38. The longitudinal members 40 are thus shorter than the cross members 42. In the alternative, it can be provided that no air-conditioning module 26 is held on the support frame 38. It goes without saying that the modules (air-conditioning module 26 or condenser module 18), which are not held on the support frame 38, can be accommodated at a different point in the vehicle 10. In the alternative, the air-conditioning system 12 can also be embodied without the respective module. Apart from that, the second alternative of the first embodiment corresponds to the first alternative of the first embodiment, to the above description of which reference is made in this regard.

The second embodiment of the air-conditioning system 12 illustrated in FIGS. 6 to 17 differs from the first embodiment of the air-conditioning system 12 illustrated in FIGS. 1 to 5 in that the support frame 38 is divided in such a way that the condenser module 18 is held on a first part 48 of the support frame and the air-conditioning module 26 is held on a second part 50 of the support frame 38. The first part 48 and the second part 50 can thus be provided with the parts, which are held by the support frame 38, so as to be separated from one another. The condenser module 18 can thus for example be set up on the first part 48 of the support frame and, separated therefrom, the air-conditioning module 26 can be set up on the second part 50 of the support frame 38. The two parts 48 and 50 with the respective superstructures can then be connected to one another when mounting the air-conditioning system 12 to the vehicle roof 16 of the vehicle 10.

The connection between the first part 48 and the second part 50 of the support frame 38 is also made via plug-type connections 45 with securing element 47, as illustrated for example in FIGS. 8 to 13, by means of a combined plug-type and screw connection 52. The two parts 48 and 50 of the support frame 38 are thereby plugged into one another and the screw connection 52 in the overlapping area of the two parts 48, 50 of the support frame 38 is established by the screw connection 52 to the vehicle roof 16, so that both parts of the support frame 48, 50 are connected to the vehicle roof 16 by means of the screw connection 52.

As is illustrated for example in FIGS. 8 to 11, the support frame 38 has a plug element 56 on the first part 48, which can be plugged into a plug opening 54 on the second part 50 of the support frame 38. The plug element 56 is thereby embodied so as to be flat and elongated and, on its front side, has a recess 58, through which a screw or a bolt, which represent the securing element 47, of the screw connection 52 can engage. In the area of the plug opening 54, the second part 50 accordingly also has a hole 60, through which a screw or a bolt of the screw connection 52 can engage through the support frame. In a plugged-together position, the recess 58 and the hole 60 are located on top of one another, so that an individual screw or bolt of the screw connection 52 can engage through the hole as well as through the recess 58 and can thus connect the first part 48 as well as the second part 50 of the support frame 38 to the vehicle roof 16. The two parts of the support frame 38 are thus accordingly also connected to one another.

Figure 12:
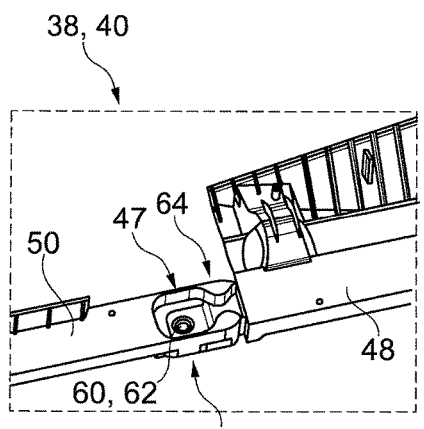
FIG. 12 shows a perspective illustration of an area, which corresponds to the area A from FIG. 7, of a further alternative of the second embodiment of the support frame.
Figure 13:
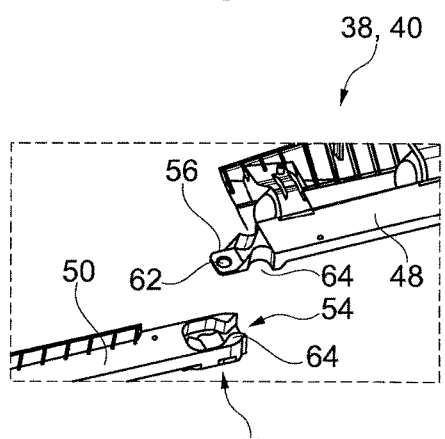
FIG. 13 shows a view, which corresponds to FIG. 12, whereby a first part of the support frame and a second part of the support frame are separated from one another.
Figure 14:
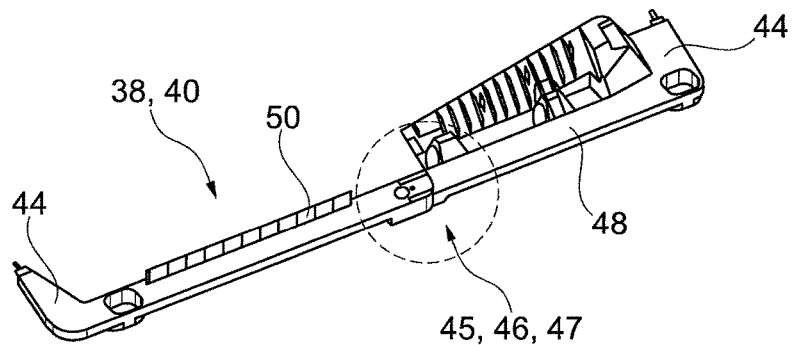
FIG. 14 shows a perspective view onto a longitudinal member of a support frame according to a fourth alternative of the second embodiment.
Figure 15:
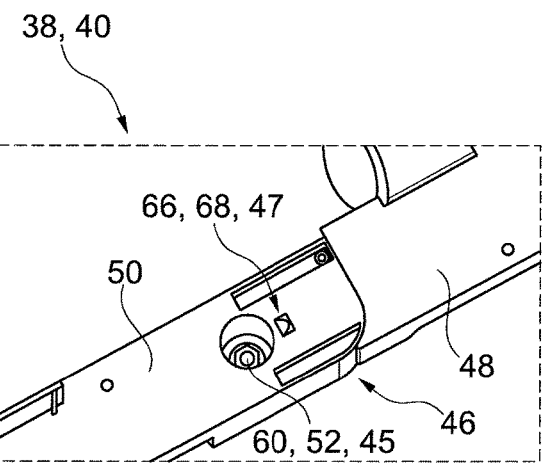
FIG. 15 shows a perspective view of the area B from FIG. 14.
Figure 16:
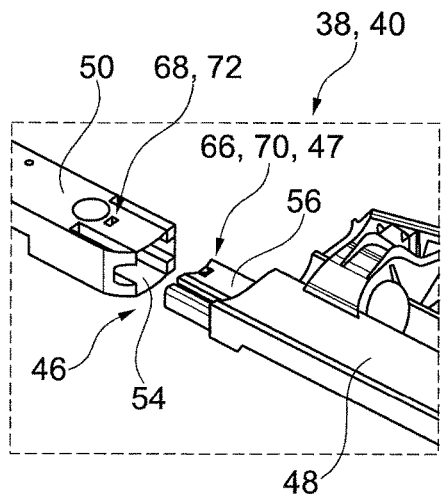
FIG. 16 shows an enlarged illustration of the area B from FIG. 14, whereby the two parts of the support frame are separated.
Figure 17:
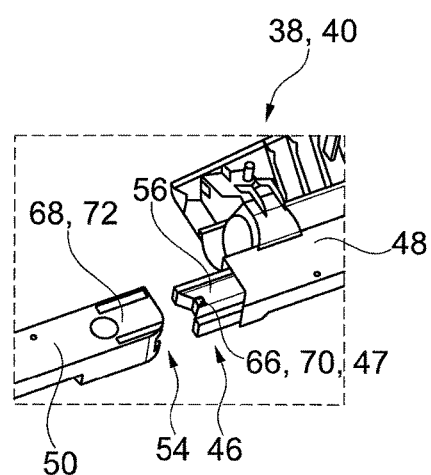
FIG. 17 shows a view, which corresponds to FIG. 6, whereby the perspective is rotated.
Figure 18:
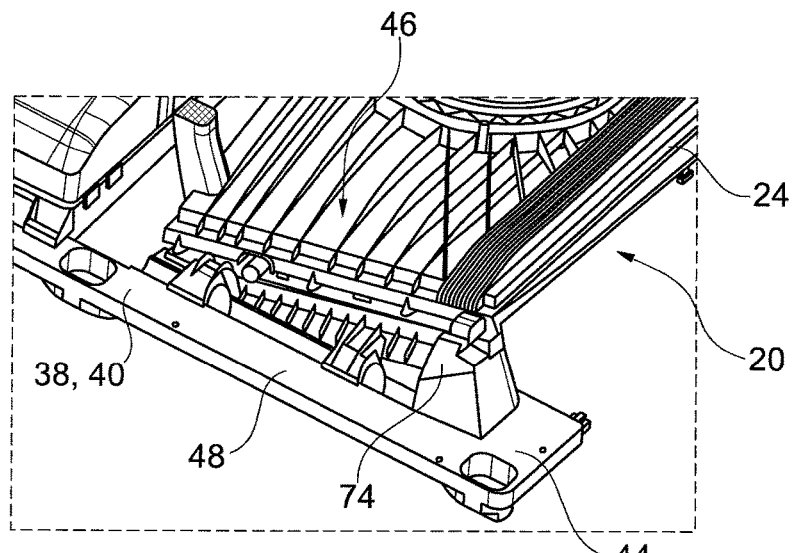
FIG. 18 shows a perspective view onto a condenser module support, which is arranged on the support frames, having a condenser housing, which is connected to the condenser module support.
Figure 19:
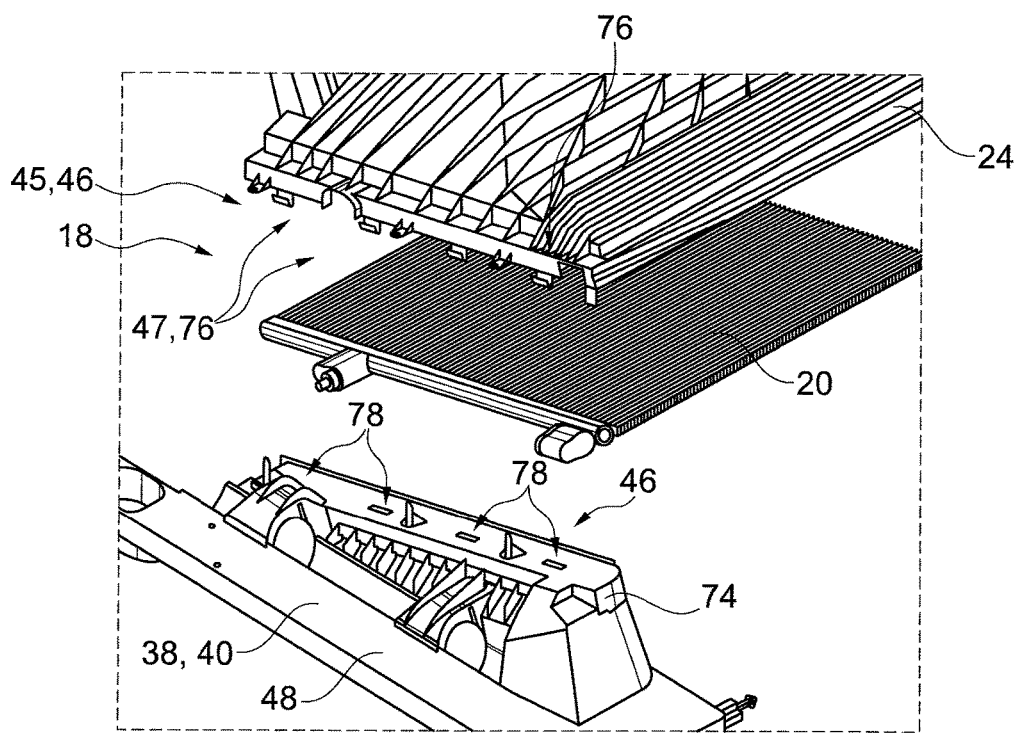
FIG. 19 shows a view, which corresponds to FIG. 18, whereby the condenser housing and the condenser are released from the condenser module support.
Figure 20:
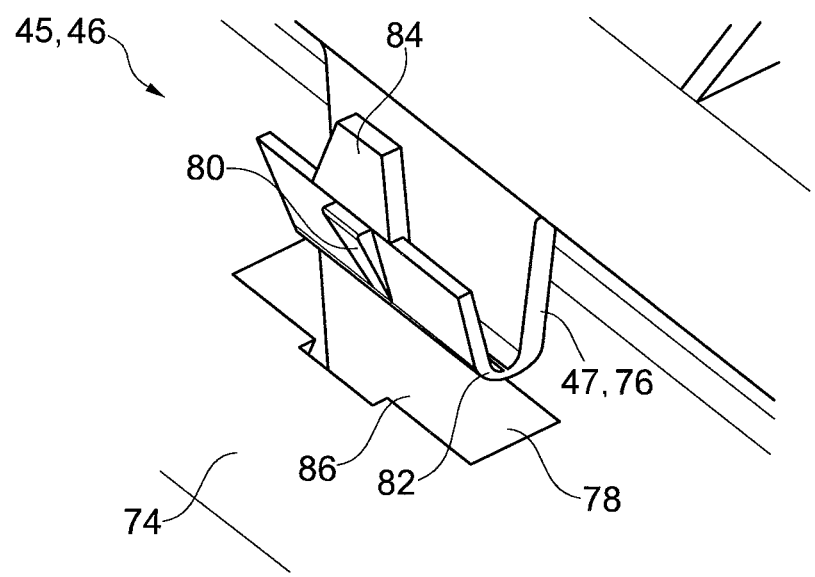
FIG. 20 shows an enlarged illustration of a detent connection having a detent element and a counter detent element, whereby the detent connection is open.
Figure 21:
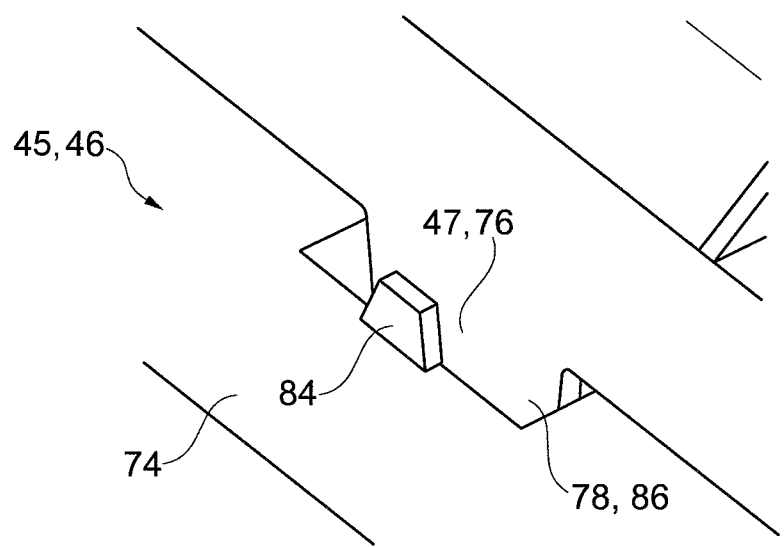
FIG. 21 shows a perspective view onto a detent connection according to FIG. 20, whereby the detent connection is closed.

In the case of a second alternative of the second embodiment, as illustrated in an exemplary manner in FIGS. 12 and 13, the plug elements 56 of the first part 48 are embodied in such a way that, instead of a recess 58, they also have a hole 62, through which a screw or a bolt, which represent the securing element 47, of the screw connection 52 can engage through the support frame. The plug element 56 is furthermore formed in such a way that a plugging direction takes place at right angles to the supports, in particular from the top to the bottom. A pulling apart of the plug-type connection in the longitudinal direction of the longitudinal member 40 or cross member 42 is not possible. This is attained in particular by means of a tapering 64, which is arranged between the hole 62 and a base body of the first part 48 of the support frame 38.

In the case of a third alternative of the second embodiment, which is illustrated in FIGS. 14 to 17, the first part 48 and the second part 50 are connected to one another by means of a detent connection 46, which represents the plug-type connection 45 with securing element 47. On the plug element 56, the first part 48 has a detent element 66, which represents the securing element 47, which cooperates with a counter detent element 68, which is arranged on the plug opening 54 of the second part 50 of the support frame 38.

The detent element 66 in particular has a detent lug 70, which is arranged so as to be located on the outside of the plug element 56. The counter detent element 68 is formed by a recess 72 in the second part 50 of the support frame 38 in the area of the plug opening 54. When the first part 48 and the second part 50 are plugged into one another, the detent lug 70 and the recess 72 are located on top of one another, so that the detent lug 70 can engage with the recess 72 and can thus establish the detent connection 46.

In the third alternative of the second embodiment, the hole 60, by means of which the support frame 38 can be fastened to the vehicle roof 16 by means of a screw connection 52, is also provided in the second part 50 of the support frame 38.

With regard to setup and function, the second embodiment of the air-conditioning system 12 illustrated in FIGS. 6 to 17 moreover corresponds to the first embodiment of the air-conditioning system 12 illustrated in FIGS. 1 to 5 to the above description of which reference is made in this regard.

A third embodiment of the air-conditioning system 12, which is illustrated in FIGS. 18 to 21, differs from the first embodiment of the air-conditioning system 12 illustrated in FIGS. 1 to 5 in that a condenser module support 74 is embodied on the support frame 38 in one piece. The condenser module support 74 is in particular embodied on the longitudinal members 40 of the support frame 38.

A plug-type connection 45 in the form of a detent connection 46 is embodied on the support frame 38, in particular on the condenser module support 74 and the condenser housing 24. The securing element 47 of the plug-type connection 45 is defined by a plurality of detent elements 76, for example four per side, embodied on the condenser housing 24, which cooperate with counter detent elements 78, which are embodied on the condenser module support 74. The detent elements 76 in each case have a detent lug 80, which is held on a spring element 82, and a lever 84, by means of which the spring element 82 can be tensioned. For this purpose, the spring element 82 is embodied to have a V-shaped cross section, whereby an arm of the V is held on the condenser housing 24, and the detent lug 80 is arranged on the other arm of the V on the outer side, and the lever 84 is arranged on the tip of the same arm of the V. If a detent connection 46 is now embodied by plugging the detent element 76 into the counter detent element 78, the lever 84 protrudes from the counter detent element 78, so that the spring element 82 can be tensioned by means of the lever 84, and the detent lug 80 can thus be pulled back, so that the detent connection 46 is released.

The counter detent elements 78 are accordingly embodied on the condenser module support 74. The counter detent elements can for example be formed by means of a rectangular depression 86, which has an undercut. This undercut can for example be attained in that the depression 86 is embodied in a flat material and engages completely through the latter. The undercut is thus formed on the rear side of the flat material.

With regard to setup and function, the third embodiment of the air-conditioning system 12 shown in FIGS. 8 to 21 moreover corresponds to the first embodiment of the air-conditioning system 12 illustrated in FIGS. 1 to 5, to the above description of which reference is made in this regard.

Figure 22:
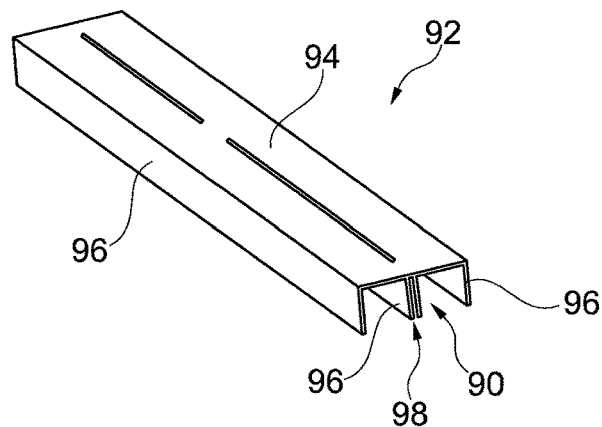
FIG. 22 shows a perspective view onto a component made of plastic having a reinforcing element.
Figure 23:
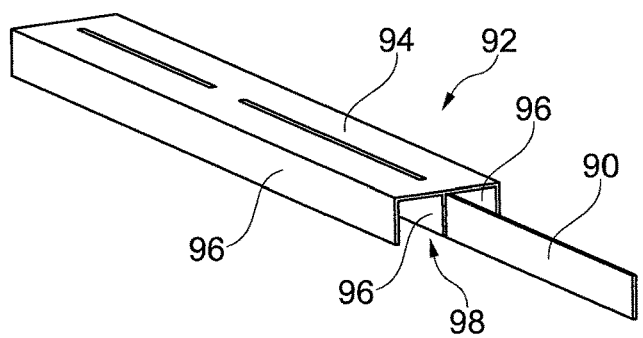
FIG. 23 shows a view, which corresponds to FIG. 22, whereby the reinforcing element is pulled out halfway.
Figure 24:
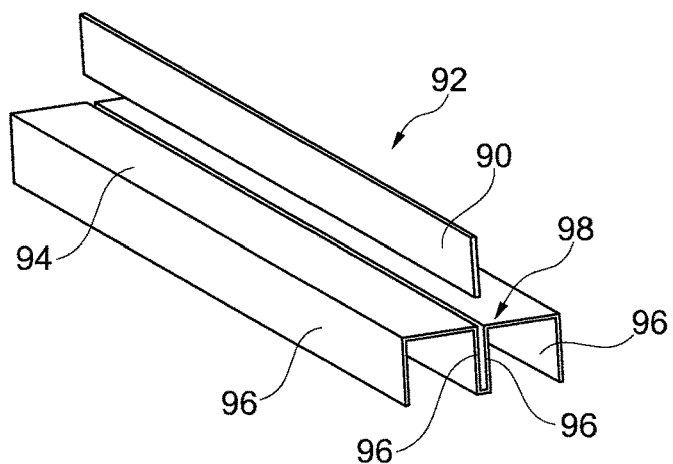
FIG. 24 shows a view, which corresponds to FIG. 22, of a different alternative of a component having a reinforcing element.

An alternative of the first to third embodiment illustrated in FIGS. 22 to 24 is characterized in that at least one component, which is made of plastic, has a reinforcing element 90. For this purpose, the component 92 is embodied in a profiled manner. The component 92 preferably has a back 94, from which members 96 extend in one direction and thus effect a reinforcement of the component 92. To arrange the reinforcing element 90 on the component 92, the component has a groove 98, into which the reinforcing element 90 can be inserted and thus reinforces the component 92. The groove 98 can for example be formed on the back 94 of the component 92 and can thereby run between two members 96. In the alternative or in addition to this, the groove 98 can also be formed directly between two members 96 and is open towards the other side, thus open on the side of the component 92, which faces away from the back 94. This results in a high flexibility, because the reinforcing element 90 can be inserted into the component 92 from both sides, depending on the design of the component 92.

Examples for such components 92 of plastic are in particular the support frame 38 and its component parts, such as, for example, the longitudinal members 40, the cross members 42, the first part 48 and the second part 50, or the condenser housing 24, the air-conditioning housing 34 or the cover 36 of the air-conditioning system 12.

The reinforcing element 90 is formed from a stiff and solid material, such as for example metal, in particular steel or aluminum. The reinforcing element 90 is preferably made of a sheet metal. Sheet metals can be processed in a simple manner, for example by punching, so that the production of the reinforcing elements is possible in a favorable manner.

The invention claimed is:
1. An air-conditioning system for a vehicle, comprising:
at least one of:
a condenser module including a condenser housing and a condenser, the condenser arranged in the condenser housing; and
an air-conditioning module including an air-conditioning housing and an evaporator, the evaporator arranged in the air-conditioning housing;
a support frame configured to support at least one of the condenser module and the air-conditioning module, the support frame configured to hold at least one of the condenser module and the air-conditioning module on a vehicle roof;
the support frame composed of plastic;
the support frame including a plurality of parts;
at least one detent housing connection disposed on the support frame, the at least one detent housing connection configured to secure at least one of the condenser housing and the air-conditioning housing to the support frame; and
at least one of:
at least one detent support connection disposed on the support frame, the plurality of parts connected to one another via the at least one detent support connection; and
at least one plug-type support connection including a securing element disposed on the support frame, the plurality of parts connected to one another via the at least one plug-type support connection.

2. The air-conditioning system according to claim 1, wherein the support frame has a substantially rectangular shape, wherein the plurality of parts includes two cross members and two longitudinal members, the cross members and the longitudinal members connected to one another via at least one of the at least one detent support connection and the at least one plug-type support connection.

3. The air-conditioning system according to claim 1, further comprising:
at least one plug-type housing connection including a securing element disposed on the support frame, the at least one plug-type housing connection configured to secure at least one of the condenser housing and the air-conditioning housing to the support frame;
wherein the support frame supports at least one of the air-conditioning module and the condenser module.

4. The air-conditioning system according to claim 1, wherein the support frame has a substantially rectangular shape, wherein the plurality of parts includes two cross members and two longitudinal members, and wherein the support frame is divided across one of i) the two longitudinal members and ii) the two cross members such that the condenser module is arranged on a first part of the support frame and the air-conditioning module is arranged on a second part of the support frame.

5. The air-conditioning system according to claim 1, wherein the condenser housing is connected to the support frame via the at least one detent housing connection.

6. The air-conditioning system according to claim 5, wherein the at least one detent housing connection includes a plurality of detent elements arranged on the condenser housing, each of the plurality of detent elements including a spring element and a detent lug, the detent lug secured on the spring element.

7. The air-conditioning system according to claim 6, further comprising a plurality of counter detent elements structured as depressions having an undercut, wherein the plurality of counter detent elements engage the plurality of detent elements, and wherein the plurality of counter detent elements are arranged on the support frame.

8. The air-conditioning system according to claim 7, wherein the plurality of detent elements respectively include a lever that protrudes from the plurality of counter detent elements when the plurality of detent elements and the plurality of counter detent elements are engaged with one another and define the at least one detent housing connection, and wherein the lever is configured such that when operated the detent lug can be moved to release the at least one detent housing connection.

9. The air-conditioning system according to claim 1 wherein the condenser housing is composed of plastic.

10. The air-conditioning system according to claim 1 further comprising at least one reinforcing element that reinforces a component composed of plastic.

11. A vehicle, comprising:
an air-conditioning system including:
at least one of:
a condenser module including a condenser housing and a condenser, the condenser arranged in the condenser housing; and
an air-conditioning module including an air-conditioning housing and an evaporator, the evaporator arranged in the air-conditioning housing;
a plastic support frame including a plurality of parts, the support frame configured to support at least one of the condenser module and the air-conditioning module, and the support frame configured to hold at least one of the condenser module and the air-conditioning module on a vehicle roof;
at least one detent housing connection disposed on the support frame, the at least one detent housing connection configured to secure at least one of the condenser housing and the air-conditioning housing to the support frame; and
at least one of:
at least one detent support connection disposed on the support frame, the plurality of parts connected to one another via the at least one detent support connection; and
at least one plug-type support connection that includes a securing element disposed on the support frame, the plurality of parts connected to one another via the at least one plug-type support connection;
wherein the air-conditioning system is arranged on the vehicle roof of the vehicle and air-conditions an interior of the vehicle.

12. The vehicle according to claim 11, wherein the vehicle is one of a bus, a heavy goods vehicle, and a rail vehicle.

13. The vehicle according to claim 11, wherein the air-conditioning system is configured to be mounted on the vehicle roof.

14. The vehicle according to claim 11, wherein the support frame has a substantially rectangular shape, wherein the plurality of parts includes two cross members and two longitudinal members, and wherein the support frame is divided across one of i) the two longitudinal members and ii) the two cross members such that the condenser module is arranged on a first part of the support frame and the air-conditioning module is arranged on a second part of the support frame.

15. The vehicle according to claim 14, wherein the condenser housing is connected to the support frame via the at least one detent housing connection.

16. The vehicle according to claim 15, wherein the at least one detent housing connection includes a plurality of detent elements arranged on the condenser housing, each of the plurality of detent elements including a spring element and a detent lug, the detent lug secured on the spring element.

17. The vehicle according to claim 16, further comprising a plurality of counter detent elements structured as depressions having an undercut, wherein the plurality of counter detent elements engage the plurality of detent elements, and wherein the plurality of counter detent elements are arranged on the support frame.

18. The vehicle according to claim 17, wherein the plurality of detent elements respectively include a lever that protrudes from the plurality of counter detent elements when the plurality of detent elements and the plurality of counter detent elements are engaged with one another and define the at least one detent housing connection, and wherein the lever is configured such that when operated the detent lug can be moved to release the at least one detent housing connection.

19. An air-conditioning system for a vehicle, comprising:
a condenser module including a condenser housing and a condenser, the condenser arranged in the condenser housing;
an air-conditioning module including an air-conditioning housing and an evaporator, the evaporator arranged in the air-conditioning housing;
a substantially rectangular plastic support frame including a plurality of parts, the support frame configured to support at least one of the condenser module and the air-conditioning module, and the support frame configured to hold at least one of the condenser module and the air-conditioning module on a vehicle roof;
at least one detent housing connection disposed on the support frame, the at least one detent housing connection configured to secure at least one of the condenser housing and the air-conditioning housing to the support frame; and
at least one of:
at least one detent support connection disposed on the support frame, the plurality of parts connected to one another via the at least one detent support connection; and
at least one plug-type support connection that includes a securing element disposed on the support frame, the plurality of parts connected to one another via the at least one plug-type support connection.

20. The air-conditioning system according to claim 19, wherein the condenser housing is connected to the support frame via the at least one detent housing connection.

* * * * *